US010976509B2

(12) United States Patent
Shibata

(10) Patent No.: US 10,976,509 B2
(45) Date of Patent: Apr. 13, 2021

(54) OPTICAL DEVICE AND MANUFACTURING METHOD OF OPTICAL DEVICE

(71) Applicant: Fujitsu Optical Components Limited, Kawasaki (JP)

(72) Inventor: Kohei Shibata, Isehara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/872,403

(22) Filed: Jan. 16, 2018

(65) Prior Publication Data

US 2018/0217342 A1 Aug. 2, 2018

(30) Foreign Application Priority Data

Feb. 2, 2017 (JP) ................. JP2017-017944

(51) Int. Cl.
G02B 6/42 (2006.01)
(52) U.S. Cl.
CPC .......... *G02B 6/4238* (2013.01); *G02B 6/423* (2013.01); *G02B 6/4231* (2013.01); *G02B 6/4257* (2013.01); *G02B 6/4232* (2013.01)
(58) Field of Classification Search
CPC .. G02B 6/4238; G02B 6/4236; G02B 6/4228; G02B 6/4231
See application file for complete search history.

(56) References Cited

U.S. PATENT DOCUMENTS 5,535,296 A * 7/1996 Uchida .................. G02B 6/421
  385/137
5,656,507 A   8/1997 Welbourn et al.
5,675,684 A * 10/1997 Hirataka .............. G02B 6/4232
  385/88
6,832,013 B1   12/2004 Kuhmann et al.
2001/0010743 A1   8/2001 Cayrefourcq et al.
2002/0044745 A1   4/2002 Fernier et al.
(Continued)

FOREIGN PATENT DOCUMENTS

JP      7-503328    4/1995
JP    2000-35522    2/2000
JP    2002-55264    2/2002
(Continued)

OTHER PUBLICATIONS

First Notification of Office Action, dated Sep. 3, 2019, in Chinese Application No. 201810096231.5 (19 pp.).
(Continued)

*Primary Examiner* — Chris H Chu
(74) *Attorney, Agent, or Firm* — Staas & Halsey LLP

(57) ABSTRACT

An optical device includes a substrate. The substrate includes a first optical waveguide component having a first optical waveguide, a pair of first projections in which a gap between side faces thereof varies in a direction along an optical axis of the first optical waveguide, and a first pattern. The optical device includes a second optical waveguide component. The second optical waveguide component includes a second optical waveguide, at least one pair of second projections, and a second pattern. The second pattern and the first pattern are soldered to each other and side faces of the at least one pair of second projections are in contact with the side faces of the pair of first projections, respectively.

5 Claims, 7 Drawing Sheets

(56) References Cited

U.S. PATENT DOCUMENTS

2014/0334773 A1* 11/2014 Mathai ................ G02B 6/4292
385/14
2016/0306120 A1    10/2016 Matsumoto

FOREIGN PATENT DOCUMENTS

| JP | 2003-517630 | 5/2003 |
| JP | 2003-523085 | 7/2003 |
| JP | 2007309987 A | 11/2007 |
| JP | WO2015098854 A1 | 3/2017 |

OTHER PUBLICATIONS

Office Action, dated Feb. 3, 2020, in Chinese Application No. 201810096231.5 (14 pp.).
Notice of Reasons for Refusal, dated Oct. 20, 2020, in corresponding Japanese Application No. 2017-017944 (5 pp.).
Notice of Reasons for Refusal, dated Jan. 26, 2021, in corresponding Japanese Application No. 2017-017944 (5 pp.).

* cited by examiner

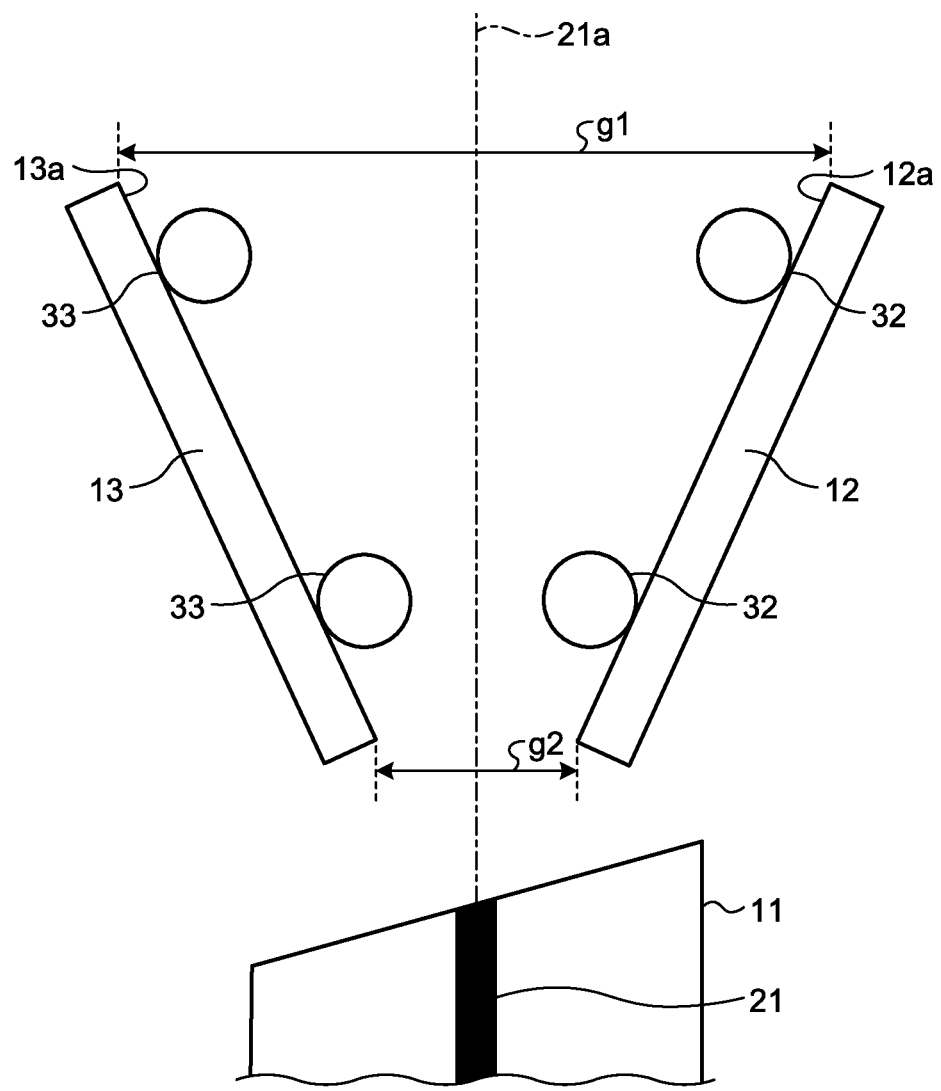

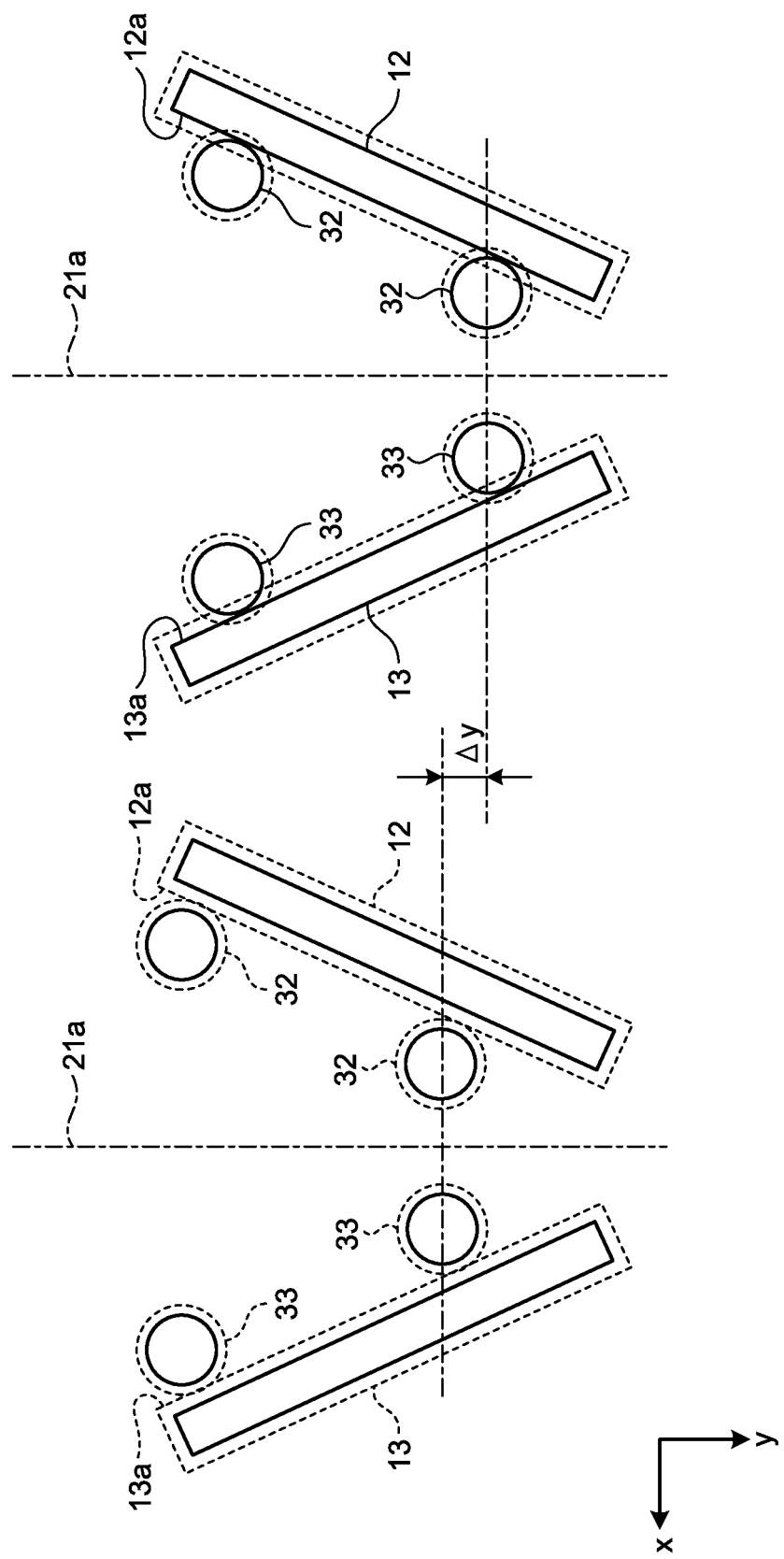

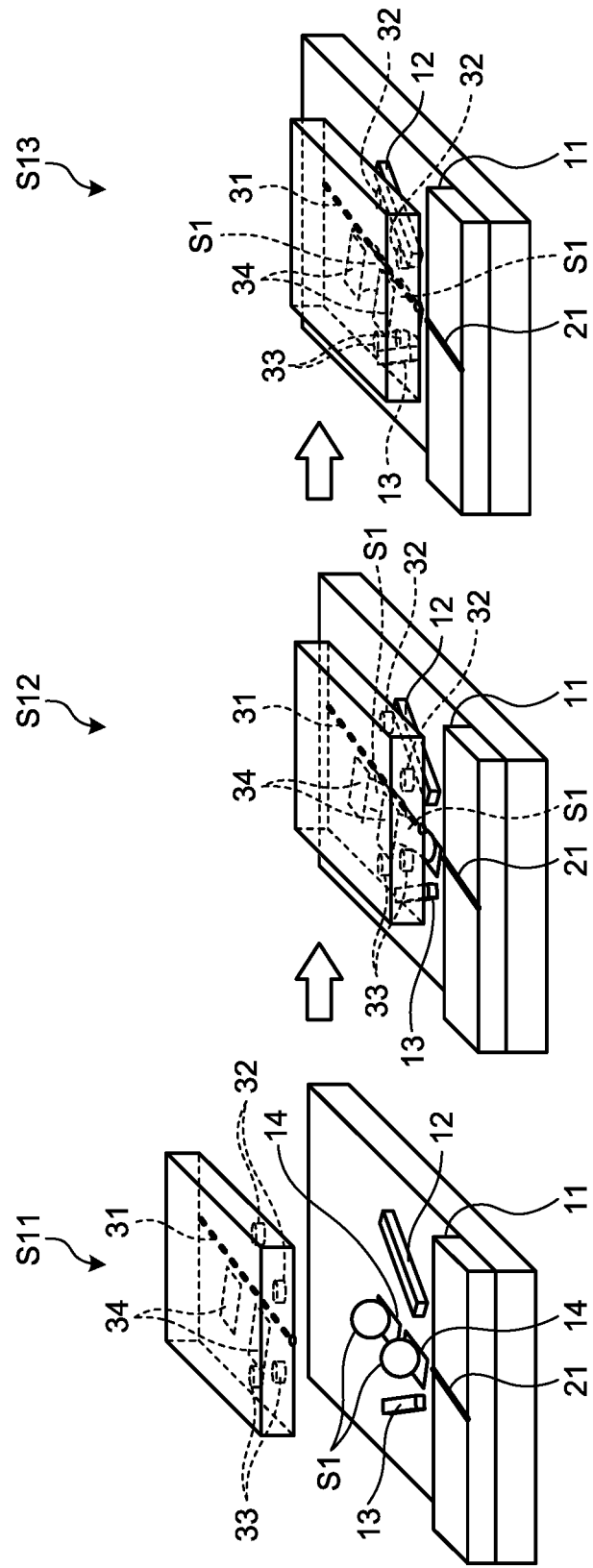

OPTICAL DEVICE AND MANUFACTURING METHOD OF OPTICAL DEVICE

CROSS-REFERENCE TO RELATED APPLICATION

This application is based upon and claims the benefit of priority of the prior Japanese Patent Application No. 2017-017944, filed on Feb. 2, 2017, the entire contents of which are incorporated herein by reference.

FIELD

The embodiment discussed herein is related to an optical device and a manufacturing method of an optical device.

BACKGROUND

In recent years, hybrid mounting has been drawing attention in the optical transmission field, which enables a plurality of components each including an optical waveguide to be mounted on one substrate. For an optical device employing this hybrid mounting, a method called self-alignment is sometimes used, in which optical waveguides are optically coupled to each other using surface tension of solder.

That is, in the self-alignment, a substrate on which a first optical waveguide component having an optical waveguide is mounted and a second optical waveguide component having an optical waveguide are prepared, an electrode pattern of the substrate and an electrode pattern of the second optical waveguide component are arranged to be opposed to each other, and the opposed electrode patterns are connected to each other with solder. When the solder between the opposed electrode patterns is melted, a force based on surface tension of the solder between the opposed electrode patterns is applied from the solder to the electrode pattern of the second optical waveguide component, and the second optical waveguide component moves on the substrate in accordance with the force applied to the electrode pattern. As a result, an end face of the optical waveguide of the second optical waveguide component approaches an end face of the optical waveguide of the first optical waveguide component, so that the optical waveguide of the second optical waveguide component is optically coupled to the optical waveguide of the first optical waveguide component.

In this self-alignment, when relative positions of the optical waveguides are displaced from each other, accuracy of optical coupling is lowered and coupling loss increases. Therefore, it is desirable to accurately position a component that is to move on the substrate (that is, the second optical waveguide component) when soldering is performed. Hence, it has been studied that, when two optical waveguides are optically coupled to each other in association with soldering, a side face of a projection provided on the second optical waveguide component is brought into contact with a side face of a projection provided on the substrate, thereby aligning the second optical waveguide component with an appropriate position on the substrate.

However, in a case of simply bringing the side faces of the projections into contact with each other, the second optical waveguide component may be displaced from the appropriate position because there may be individual differences in size of the projections for some manufacturing accuracies of the projections. If the second optical waveguide component is displaced from the appropriate position, the relative positions of the optical waveguide of the second optical waveguide component and the optical waveguide of the first optical waveguide component are displaced from each other, which may result in lowering of accuracy of optical coupling.

SUMMARY

According to an aspect of an embodiment, an optical device includes a substrate that includes a first optical waveguide component having a first optical waveguide, a pair of first projections in which a gap between side faces thereof varies in a direction along an optical axis of the first optical waveguide, and a first pattern; and a second optical waveguide component that includes a second optical waveguide, at least one pair of second projections, and a second pattern, the second pattern and the first pattern being soldered to each other, side faces of the at least one pair of second projections being in contact with the side faces of the pair of first projections, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a state of contact between side faces of two pairs of projections and side faces of one pair of projections in the embodiment;

FIG. 3 is an explanatory diagram of an influence of positional displacement of an optical waveguide component in accordance with manufacturing accuracy of projections;

FIG. 5 is an explanatory diagram of a manufacturing method of the optical device according to the embodiment;

DESCRIPTION OF EMBODIMENT

Preferred Embodiment of the Present Invention will be explained with reference to accompanying drawings. The disclosed techniques are not limited to the embodiments.

Figure 1A:
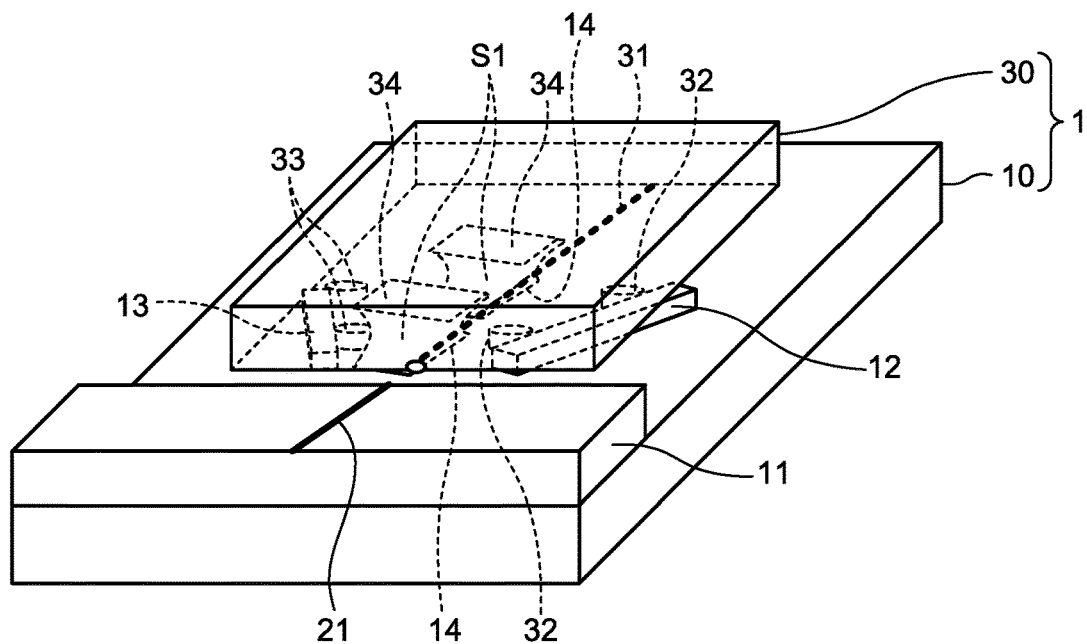
FIG. 1A is a perspective view illustrating a configuration of an optical device according to an embodiment of the present invention.
Figure 1B:
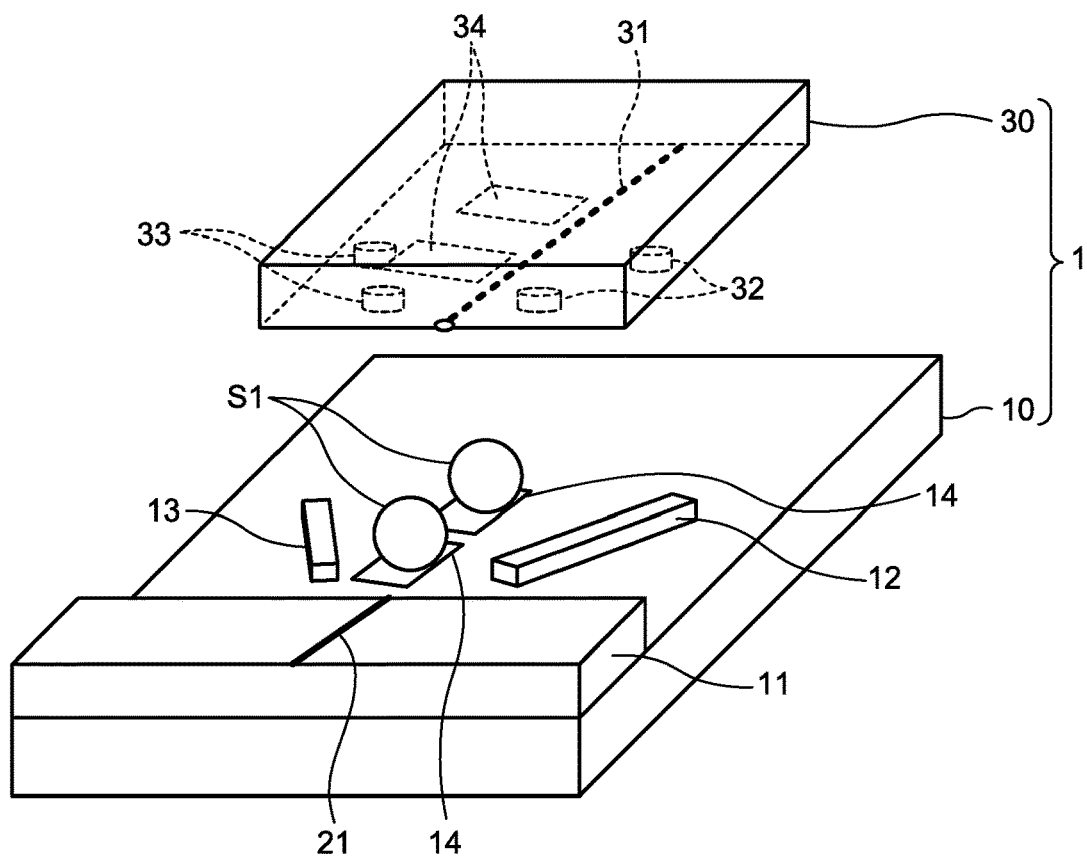
FIG. 1B is an exploded perspective view of the optical device according to the embodiment.

A configuration of an optical device according to the present embodiment is described first. FIG. 1A is a perspective view illustrating a configuration of an optical device 1 according to the present embodiment. FIG. 1B is an exploded perspective view of the optical device 1 according to the present embodiment. As illustrated in FIGS. 1A and 1B, the optical device 1 includes a substrate 10 and an optical waveguide component 30. FIG. 1B illustrates a state in which the optical waveguide component 30 is separated from the substrate 10.

The substrate 10 includes an optical waveguide component 11, a pair of projections 12 and 13, and electrode patterns 14. The optical waveguide component 11 includes an optical waveguide 21. One end face of the optical waveguide 21 is opposed to the optical waveguide component 30, and serves as an input-side end face that receives input of signal light from the optical waveguide component 30. The other end face of the optical waveguide 21 is connected to another optical component (not illustrated), and serves as an output-side end face that outputs the signal light to the connected another optical component.

The pair of projections 12 and 13 are aligning projections for aligning the optical waveguide component 30 that is to move on the substrate 10 in association with soldering with a predetermined position, and are formed on the substrate 10 to extend along a surface of the substrate 10. A gap between side faces of the pair of projections 12 and 13 varies in a direction along an optical axis of the optical waveguide 21.

The electrode pattern 14 is a pattern in the form of an island for soldering to the optical waveguide component 30. While the number of the electrode patterns 14 can be any number, two electrode patterns 14 are provided as an example in FIGS. 1A and 1B.

The optical waveguide component 30 is a light-emitting element that outputs signal light corresponding to an electric signal from an optical waveguide, and is mounted on the substrate 10 by self-alignment. The optical waveguide component 30 includes an optical waveguide 31, two pairs of projections 32 and 33, and electrode patterns 34. One end face of the optical waveguide 31 is opposed to the optical waveguide component 11, and serves as an output-side end face that outputs the signal light to the optical waveguide component 11. The optical waveguide 31 is inclined with respect to the output-side end face in order to suppress reflection of light at the output-side end face.

The two pairs of projections 32 and 33 are aligning projections for aligning the optical waveguide component 30 that is to move on the substrate 10 in association with soldering with the predetermined position. The numbers of the pairs of projections 32 and 33 is not limited to two and can be any number. It suffices that at least one pair of projections 32 and 33 is provided on the optical waveguide component 30.

The electrode pattern 34 is a pattern in the form of an island for soldering to the substrate 10. While the number of the electrode patterns 34 can be any number, two electrode patterns 34 are provided to respectively correspond to the two electrode patterns 14 as an example in FIGS. 1A and 1B. The electrode patterns 34 are connected to the corresponding electrode patterns 14 of the substrate 10, respectively, with solder S1.

In the mode illustrated in FIGS. 1A and 1B, during connection of the electrode patterns 34 and the electrode patterns 14 with the solder S1, when the solder S1 between the opposed electrode patterns 14 and 34 is melted, a force based on surface tension of the solder S1 is applied from the solder S1 to the electrode patterns 34. The optical waveguide component 30 then moves on the substrate 10 in accordance with the force applied to the electrode patterns 34. As a result, the output-side end face of the optical waveguide 31 of the optical waveguide component 30 approaches the input-side end face of the optical waveguide 21 of the optical waveguide component 11, so that the optical waveguide 31 is optically coupled to the optical waveguide 21. However, when relative positions of the optical waveguide 31 and the optical waveguide 21 are displaced from each other while the output-side end face of the optical waveguide 31 approaches the input-side end face of the optical waveguide 21 in association with soldering of the electrode patterns 34 and the electrode patterns 14 to each other, accuracy of optical coupling is lowered. Therefore, it is important to accurately position the optical waveguide component 30 that is to move on the substrate 10 during soldering.

In the optical device 1 according to the present embodiment, when the optical waveguide 31 and the optical waveguide 21 are to be optically coupled to each other by soldering, side faces of the two pairs of projections 32 and 33 are brought into contact with the side faces of the pair of projections 12 and 13, respectively, to align the optical waveguide component 30 with an appropriate position on the substrate 10, thereby improving accuracy of optical coupling.

FIG. 2 illustrates a state of contact between side faces of the two pairs of projections 32 and 33 and side faces of the pair of projections 12 and 13 in the present embodiment. As illustrated in FIG. 2, a gap between inner side faces 12a and 13a of the pair of projections 12 and 13 continuously and gradually becomes narrower from a gap g1 to a gap g2 in a direction along an optical axis 21a of the optical waveguide 21, as approaching the optical waveguide component 11. The side faces of the two pairs of projections 32 and 33 respectively come into contact with the inner side faces 12a and 13a of the pair of projections 12 and 13. With this configuration, the optical waveguide component 30 is aligned with an appropriate position on the substrate 10. As a result, relative positional displacement of the optical waveguide 31 of the optical waveguide component 30 and the optical waveguide 21 of the optical waveguide component 11 on the substrate 10 is suppressed irrespective of manufacturing accuracy of projections (that is, the two pairs of projections 32 and 33 and the pair of projections 12 and 13), so that accuracy of optical coupling is improved.

Further, the pair of projections 12 and 13 are provided at symmetrical positions on the substrate 10 with respect to the optical axis 21a of the optical waveguide 21. With this configuration, when the side faces of the two pairs of projections 32 and 33 respectively come into contact with the inner side faces 12a and 13a of the pair of projections 12 and 13, the optical waveguide component 30 is appropriately guided in the direction along the optical axis 21a of the optical waveguide 21. As a result, the relative positional displacement of the optical waveguide 31 of the optical waveguide component 30 and the optical waveguide 21 of the optical waveguide component 11 on the substrate 10 is further suppressed irrespective of the manufacturing accuracy of the projections (that is, the two pairs of projections 32 and 33 and the pair of projections 12 and 13), so that the accuracy of the optical coupling is further improved.

FIG. 3 is an explanatory diagram of an influence of positional displacement of the optical waveguide component 30 in accordance with manufacturing accuracy of the projections. The left portion of FIG. 3 illustrates a state in which the side faces of the two pairs of projections 32 and 33 are respectively in contact with the side faces of the pair of projections 12 and 13 in a case where the two pairs of projections 32 and 33 and the pair of projections 12 and 13 are manufactured to be relatively large in size. The right portion of FIG. 3 illustrates a state in which the side faces of the two pairs of projections 32 and 33 are respectively in contact with the side faces of the pair of projections 12 and 13 in a case where the two pairs of projections 32 and 33 and the pair of projections 12 and 13 are manufactured to be relatively small in size. In FIG. 3, a broken line represents the outline of each projection in the case where the two pairs of projections 32 and 33 and the pair of projections 12 and 13 are manufactured to be relatively large in size, and a solid line represents the outline of each projection in the case where the two pairs of projections 32 and 33 and the pair of projections 12 and 13 are manufactured to be relatively small in size. Further, in FIG. 3, the y axis is defined in a direction along the optical axis 21a of the optical waveguide 21, and the x axis is defined in a direction perpendicular to the optical axis 21a of the optical waveguide 21.

As illustrated in FIG. 3, positions at which the side faces of the two pairs of projections 32 and 33 come into contact with the side faces of the pair of projections 12 and 13 are displaced by Δy in the direction along the optical axis 21a of the optical waveguide 21 (that is, the y-axis direction), as the sizes of the projections become smaller. Therefore, the optical waveguide component 30 is displaced by Δy in the direction along the optical axis 21a of the optical waveguide 21 (that is, in the y-axis direction), as the sizes of the projections become smaller. Meanwhile, the gap between the inner side faces 12a and 13a of the pair of projections 12 and 13 becomes narrower in the y-axis direction as approaching the optical waveguide component 11, and the side faces of the two pairs of projections 32 and 33 respectively come into contact with the inner side faces 12a and 13a of the pair of projections 12 and 13. With this configuration, while the optical waveguide component 30 moves on the substrate 10 in association with soldering, movement in the direction perpendicular to the optical axis 21a of the optical waveguide 21 (that is, the x-axis direction) is restricted, so that positional displacement of the optical waveguide component 30 in the x-axis direction is minimized.

Figure 4A:
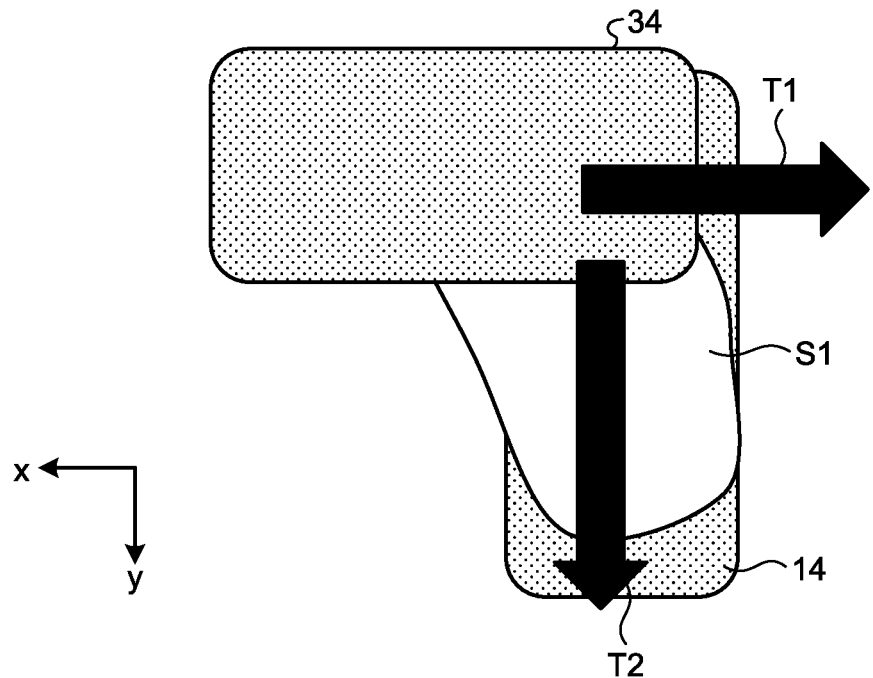
FIG. 4A is an explanatory diagram of a location of electrode patterns.
Figure 4B:
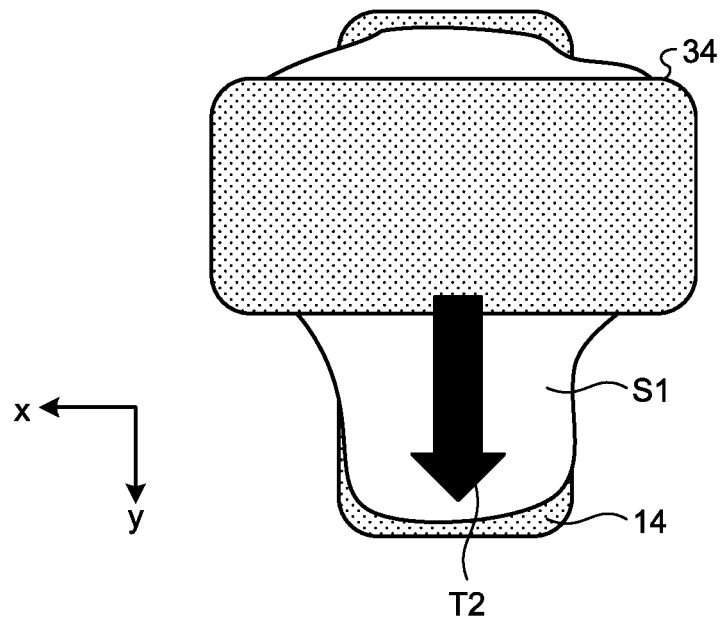
FIG. 4B is an explanatory diagram of a location of the electrode patterns.

FIGS. 4A and 4B are explanatory diagrams of a location of the electrode pattern 34. FIG. 4A illustrates a positional relation between the electrode pattern 34 and the electrode pattern 14 before the side faces of the two pairs of projections 32 and 33 are in contact with the side faces of the pair of projections 12 and 13. Meanwhile, FIG. 4B illustrates a positional relation between the electrode pattern 34 and the electrode pattern 14 after the side faces of the two pairs of projections 32 and 33 are in contact with the side faces of the pair of projections 12 and 13.

As described above, a force based on surface tension of the solder S1 between the electrode pattern 34 and the electrode pattern 14 is applied from the solder S1 to the electrode pattern 34 in association with soldering of the electrode pattern 34 and the electrode pattern 14 to each other. The force applied from the solder S1 to the electrode pattern 34 includes a force T1 applied in a direction perpendicular to the optical axis 21a of the optical waveguide 21 (that is, the x-axis direction) and a force T2 applied in a direction parallel to the optical axis 21a of the optical waveguide 21 (that is, the y-axis direction), as illustrated in FIG. 4A. The electrode pattern 34 is provided at a position in the optical waveguide component 30 at which the force T2 applied in the y-axis direction remains while the side faces of the two pairs of projections 32 and 33 are in contact with the side faces of the pair of projections 12 and 13, as illustrated in FIG. 4B. For example, the electrode pattern 34 is provided at such a position that an edge portion of the electrode pattern 34 and an edge portion of the electrode pattern 14 are offset from each other in the y-axis direction while the side faces of the two pairs of projections 32 and 33 are in contact with the side faces of the pair of projections 12 and 13. With this configuration, while the side faces of the two pairs of projections 32 and 33 are in contact with the side faces of the pair of projections 12 and 13, the optical waveguide component 30 is drawn to the optical waveguide component 11 along the y-axis direction in accordance with the force T2. Therefore, the optical waveguide component 30 is aligned with an appropriate position on the substrate 10, and relative positional displacement between the optical waveguide 31 of the optical waveguide component 30 and the optical waveguide 21 of the optical waveguide component 11 on the substrate 10 is suppressed. Consequently, the accuracy of the optical coupling is further improved.

A manufacturing method of the optical device 1 according to the present embodiment is described next. FIG. 5 is an explanatory diagram of the manufacturing method of the optical device 1 according to the present embodiment. In the manufacturing method, the optical waveguide component 30 is placed on the pair of projections 12 and 13 of the substrate 10, thereby arranging the electrode patterns 14 of the substrate 10 and the electrode patterns 34 of the optical waveguide component 30 to be opposed to each other (Step S11).

Subsequently, in the manufacturing method, the solder S1 between the electrode patterns 34 and the electrode patterns 14 is melted, thereby causing an output-side end face of the optical waveguide 31 to approach an input-side end face of the optical waveguide 21 (Step S12).

Subsequently, in the manufacturing method, the process waits until side faces of the two pairs of projections 32 and 33 are in contact with side faces of the pair of projections 12 and 13 (Step S13). The optical device 1 illustrated in FIG. 1A is thus obtained.

As described above, the optical device 1 includes the substrate 10 and the optical waveguide component 30. The substrate 10 includes the optical waveguide component 11 having the optical waveguide 21, the pair of projections 12 and 13 in which a gap between side faces thereof varies in a direction along the optical axis 21a of the optical waveguide 21, and the electrode patterns 14. The optical waveguide component 30 includes the optical waveguide 31, the two pairs of projections 32 and 33, and the electrode patterns 34. In the optical waveguide component 30, side faces of the two pairs of projections 32 and 33 are respectively in contact with the side faces of the pair of projections 12 and 13, in a state where the electrode patterns 34 and the electrode patterns 14 are soldered to each other and an output-side end face of the optical waveguide 31 has approached an input-side end face of the optical waveguide 21. That is, the optical waveguide component 30 is formed in such a manner that the side faces of the two pairs of projections 32 and 33 are respectively in contact with the side faces of the pair of projections 12 and 13, when the output-side end face of the optical waveguide 31 approaches the input-side end face of the optical waveguide 21 in association with soldering of the electrode patterns 34 and the electrode patterns 14 to each other.

With the configuration of the optical device 1, the optical waveguide component 30 is aligned with an appropriate position on the substrate 10. As a result, relative positional displacement between the optical waveguide 31 of the optical waveguide component 30 and the optical waveguide 21 of the optical waveguide component 11 on the substrate 10 is suppressed irrespective of manufacturing accuracy of projections (that is, the two pairs of projections 32 and 33 and the pair of projections 12 and 13), so that optical coupling with high accuracy is achieved.

Modification

Although the above embodiment describes an example in which a gap between the side faces (for example, the inner side faces 12a and 13a) of the pair of projections 12 and 13 varies in a tapered manner, the varying manner is not limited thereto. The varying manner can be any manner, for example, in a curved manner, as long as optical coupling can be achieved.

Figure 6:
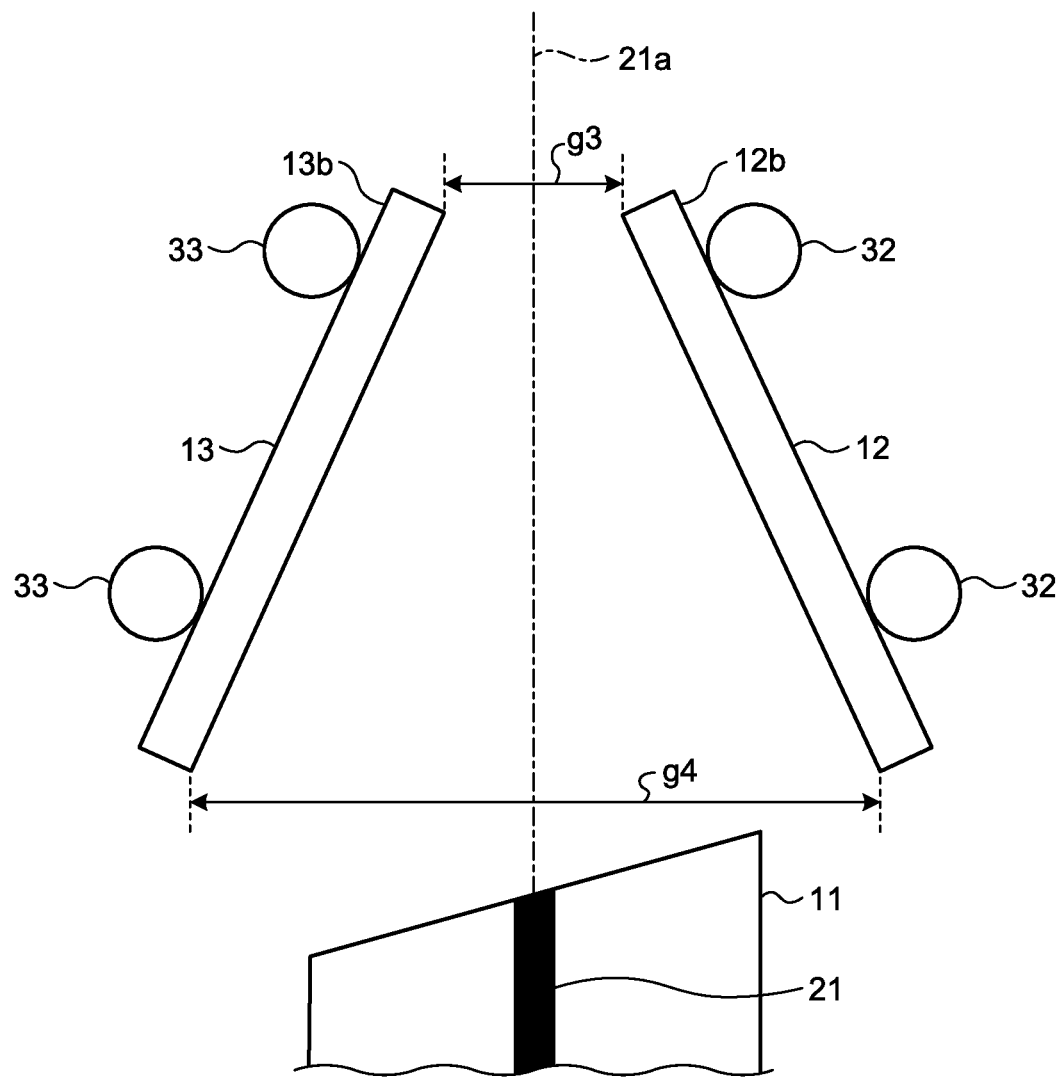
FIG. 6 is a diagram illustrating two pairs of projections and one pair of projections according to a modification.

In addition, although the above embodiment has described an example in which the side faces of the two pairs of projections 32 and 33 respectively come into contact with the inner side faces 12a and 13a of the pair of projections 12 and 13 which are opposed to each other, the disclosed technique is not limited thereto. For example, the side faces of the two pairs of projections 32 and 33 can be configured to respectively come into contact with outer side faces 12b and 13b of the pair of projections 12 and 13, which are not opposed to each other, as illustrated in FIG. 6. In this case, a gap between the outer side faces 12b and 13b of the pair of projections 12 and 13 continuously and gradually becomes wider from a gap g3 to a gap g4 in a direction along the optical axis 21a of the optical waveguide 21, as approaching the optical waveguide component 11. FIG. 6 is a diagram illustrating the two pairs of projections 32 and 33 and the pair of projections 12 and 13 according to a modification.

Application Example

Figure 7:
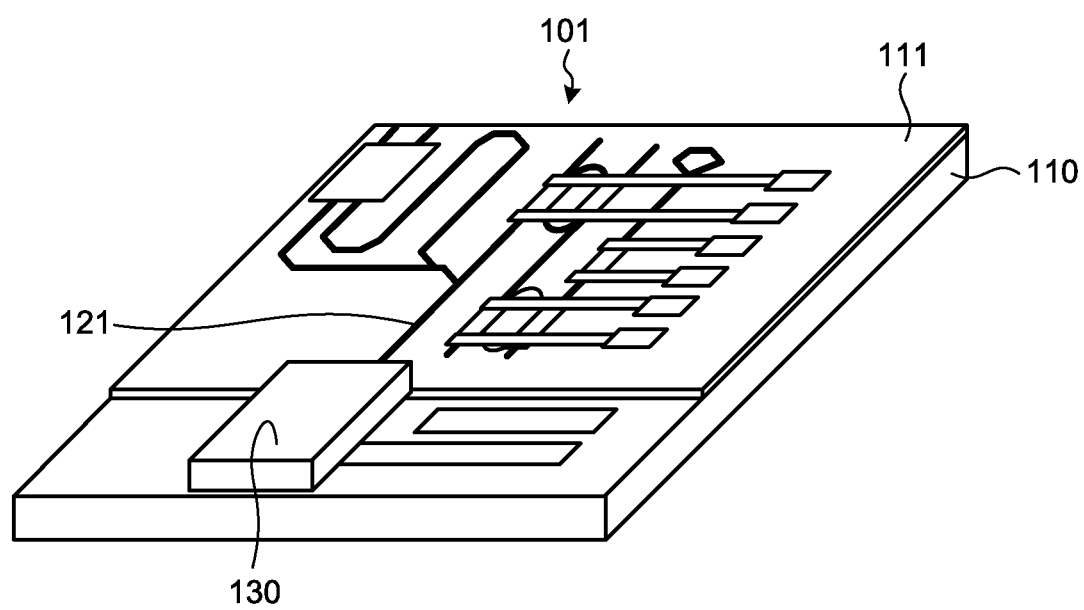
FIG. 7 is a diagram illustrating a configuration of an optical device according to an application example.

Because the optical device 1 described above can achieve optical coupling with high accuracy, it is effective to apply the optical device 1 to an optical device such as a wavelength-tunable light source. FIG. 7 is a diagram illustrating a configuration of an optical device 101 according to an application example. The optical device 101 illustrated in FIG. 7 is a wavelength-tunable light source, and includes a substrate 110 with an external resonator 111 formed thereon, and a semiconductor optical amplifier (SOA) 130 mounted on the substrate 110. The external resonator 111 includes an optical waveguide 121. The SOA 130 includes an optical waveguide (not illustrated). In FIG. 7, the substrate 110 corresponds to the substrate 10 illustrated in FIG. 1A. The external resonator 111 corresponds to the optical waveguide component 11 illustrated in FIG. 1A. The SOA 130 corresponds to the optical waveguide component 30 illustrated in FIG. 1A.

According to a mode of the optical device disclosed in the present application, there is obtained an effect where optical coupling with high accuracy can be realized.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device comprising:
    a substrate that includes a first optical waveguide component having a first optical waveguide, a pair of first projections in which a gap between side faces thereof varies in a direction along an optical axis of the first optical waveguide, and a first pattern; and
    a second optical waveguide component that includes a second optical waveguide, at least two pair of second projections, and a second pattern, the second pattern and the first pattern being soldered to each other, side faces of the at least two pair of second projections being in contact with the side faces of the pair of first projections, respectively, wherein
    the second optical waveguide component is movably placed on the pair of first projections of the substrate,
    the at least two pair of second projections come in contact with the side faces of the pair of first projections, respectively, when the second optical waveguide component moves on the pair of first projections of the substrate in association with soldering of the second pattern and the first pattern to each other,
    the pair of first projections are formed on the substrate to extend along a surface of the substrate,
    the optical axis of the first optical waveguide is provided on the substrate to extend along the surface of the substrate,
    the side faces of the pair of first projections are arranged at symmetrical positions on the substrate with respect to the optical axis of the first optical waveguide, and
    the at least two pair of second projections are arranged at positions holding the second optical waveguide therebetween and have substantially circular cross sections.

2. The optical device according to claim 1, wherein
    a gap between inner side faces of the pair of first projections becomes narrower in the direction along the optical axis of the first optical waveguide, as approaching the first optical waveguide component, and
    the side faces of the at least two pair of second projections are in contact with the inner side faces of the pair of first projections, respectively.

3. The optical device according to claim 1, wherein
    a gap between outer side faces of the pair of first projections becomes wider in the direction along the optical axis of the first optical waveguide, as approaching the first optical waveguide component, and
    the side faces of the at least two pair of second projections are in contact with the outer side faces of the pair of first projections, respectively.

4. The optical device according to claim 1, wherein the pair of first projections are arranged at symmetrical positions on the substrate with respect to the optical axis of the first optical waveguide.

5. The optical device according to claim 1, wherein
    a force based on surface tension of solder between the second pattern and the first pattern is applied from the solder to the second pattern in association with soldering of the second pattern and the first pattern to each other, and
    the second pattern is provided at a position on the second optical waveguide component, at which the force applied in a direction parallel to the optical axis of the first optical waveguide remains with the side faces of the at least two pair of second projections being in contact with the side faces of the pair of first projections, respectively.

* * * * *